United States Patent
Hu et al.

(10) Patent No.: US 6,747,373 B1
(45) Date of Patent: Jun. 8, 2004

(54) SYSTEM AND METHOD FOR COORDINATED CONTROL OF A SWITCHED POWER CAPACITOR WITH AN INTEGRATED RESONANCE PROTECTION SYSTEM

(75) Inventors: Yi Hu, Cary, NC (US); Luciano Di Maio, Milan (IT); Fabio Gatelli, Bagnolo Mella (IT); William M. Egolf, Apex, NC (US); David G. Hart, Raleigh, NC (US)

(73) Assignee: ABB Technology AG, Zurich (CH)

( * ) Notice: Subject to any disclaimer, the term of this patent is extended or adjusted under 35 U.S.C. 154(b) by 163 days.

(21) Appl. No.: 10/034,063

(22) Filed: Dec. 26, 2001

(51) Int. Cl.[7] .................................................. G05F 3/00
(52) U.S. Cl. ...................... 307/105; 307/98; 307/125; 323/209; 320/166
(58) Field of Search ........................... 307/87, 125, 98, 307/129, 130, 131, 413, 102, 105; 323/209; 320/116

(56) References Cited

U.S. PATENT DOCUMENTS

| | | | |
|---|---|---|---|
| 4,769,587 A | 9/1988 | Pettigrew | 323/209 |
| 4,891,569 A | 1/1990 | Light | 323/210 |
| 4,897,775 A | 1/1990 | Klaassens | 363/96 |
| 5,053,691 A | 10/1991 | Wild et al. | 323/211 |
| 5,224,029 A * | 6/1993 | Newman, Jr. | 363/48 |
| 5,241,256 A * | 8/1993 | Hatanaka et al. | 318/801 |
| 5,270,914 A | 12/1993 | Lauw et al. | 363/160 |
| 5,298,856 A * | 3/1994 | McEachern et al. | 324/142 |
| 5,302,890 A * | 4/1994 | McEachern et al. | 324/142 |
| 5,424,627 A * | 6/1995 | Clark et al. | 323/210 |
| 5,475,291 A * | 12/1995 | Yoshida et al. | 318/568.22 |
| 5,548,203 A | 8/1996 | Kemerer et al. | 323/210 |
| 5,600,549 A * | 2/1997 | Cross | 363/46 |
| 5,670,864 A | 9/1997 | Marx et al. | 323/211 |
| 5,672,956 A | 9/1997 | Fukui et al. | 323/210 |
| 5,677,832 A * | 10/1997 | Tissier et al. | 307/105 |
| 5,726,504 A * | 3/1998 | Pecukonis et al. | 307/105 |
| 5,825,162 A * | 10/1998 | Kida et al. | 323/207 |
| 5,977,660 A * | 11/1999 | Mandalakas et al. | 307/105 |
| 6,008,548 A | 12/1999 | Fenner et al. | 307/105 |
| 6,075,350 A * | 6/2000 | Peng | 323/207 |
| 6,147,475 A | 11/2000 | Bridgeman | 323/211 |
| 6,157,177 A | 12/2000 | Feldtkeller | 323/267 |
| 6,166,929 A * | 12/2000 | Ma et al. | 363/37 |
| 6,177,781 B1 * | 1/2001 | Chou | 323/207 |
| 6,181,113 B1 | 1/2001 | Hu et al. | 323/209 |
| 6,577,961 B1 * | 6/2003 | Hubbard et al. | 702/60 |
| 6,628,014 B2 * | 9/2003 | Borup | 307/130 |

\* cited by examiner

Primary Examiner—Gregory J. Toatley, Jr.
Assistant Examiner—Roberto J. Rios
(74) Attorney, Agent, or Firm—Woodcock Washburn LLP

(57) ABSTRACT

System and methods for coordinating the control system of a switched power capacitor with an integrated resonance protection function. The coordination system coordinates the function of a switched power capacitor's primary control system and resonance protection system to avoid duplication of tasks and on/off operation deadlock. The coordination system adjusting calculations made by the primary control system in response to a determination of a harmonic resonance condition by the resonance protection system.

20 Claims, 3 Drawing Sheets

SYSTEM AND METHOD FOR COORDINATED CONTROL OF A SWITCHED POWER CAPACITOR WITH AN INTEGRATED RESONANCE PROTECTION SYSTEM

BACKGROUND OF THE INVENTION

1. Field of the Invention

The present invention relates to systems and methods for coordinated control of a switched power capacitor with an integrated resonance protection system. More specifically, the invention relates to adjusting calculations made by the primary control system in response to a determination of a harmonic resonance condition by the resonance protection system.

2. Description of the Prior Art

Existing switched power capacitor control systems may include a primary control system and a harmonic resonance protection system. The primary control system determines if a capacitor switching operation is needed by comparing actual control parameters to target control parameters and determining if a switching operation would make the actual control parameters closer in value to the target control parameters. Target control parameters are predetermined. Actual control parameters are calculated by the primary control system based on measurements of voltages and currents obtained with voltage and current transformers respectively. If a switching operation is required, the primary control system further determines which capacitor bank is to be switched based on other factors such as, for example, a capacitor's size and whether a capacitor is connected or disconnected.

The resonance protection system monitors the circuit for harmonic resonance conditions. Harmonic resonance conditions may be due to capacitor switching operations or system changes such as, for example, a load change, a system source impedance change, or a network topology change. Harmonic resonance may cause significant harmonic distortion in the system voltages and currents, which may increase the losses in the circuit and cause damage to equipment operating in the system due to overheating and vibration. When a resonance condition due to capacitor switching operation is detected, the protection system performs additional capacitor switching operation to de-tune the circuit from the sustained resonance. If a switching operation is required, the harmonic resonance protection system further determines which capacitor is to be switched based on other factors such as, for example, a capacitor's size and whether a capacitor is connected or disconnected.

Existing switched power capacitor control systems may contain both an independent primary control system and an independent resonance protection system. The independence of these two systems results in several drawbacks. First, the independent systems must duplicate certain functions such as, for example, determining whether a capacitor is connected and generating a signal to control a capacitor. Second, the independent systems may, under certain circumstances, force the capacitor banks into a constant on/off operation deadlock. For example, the primary control system may determine that a certain capacitor bank needs to be switched on. If switching on this capacitor bank tunes the circuit to a resonance condition, then the resonance protection system will perform additional capacitor switching operations to de-tune the circuit from the sustained resonance. It is possible that the resonance protection system may determine to switch off the same capacitor bank that the primary control system switched on. Once the capacitor bank is switched off by the resonance protection system, the primary control system will switch the capacitor bank back on. This operation deadlock can cause excessive wear to the capacitors and the switching apparatus. Thus, it would be a great improvement in the art to integrate and coordinate the primary control system and the resonance protection system to avoid duplication of functions and switching deadlock.

SUMMARY OF THE INVENTION

The present invention is directed to systems and methods for coordinated control of a switched power capacitor with an integrated resonance protection function. The coordination system receives control parameters calculated by the primary control unit. The coordination system also receives from the resonance protection system an input indicating whether a harmonic resonance condition is present. If a harmonic resonance condition is present, the coordination system adjusts the control parameters. If no harmonic resonance condition is present, the control parameters calculated by the primary control system are not changed. The coordination system then performs capacitor bank switching operations based on either the control parameters originally calculated by the primary control system or the adjusted control parameters.

BRIEF DESCRIPTION OF THE DRAWINGS

The present invention will be better understood after reading the following detailed description of the presently preferred embodiments thereof with reference to the appended drawings, in which.

DETAILED DESCRIPTION

Figure 1:
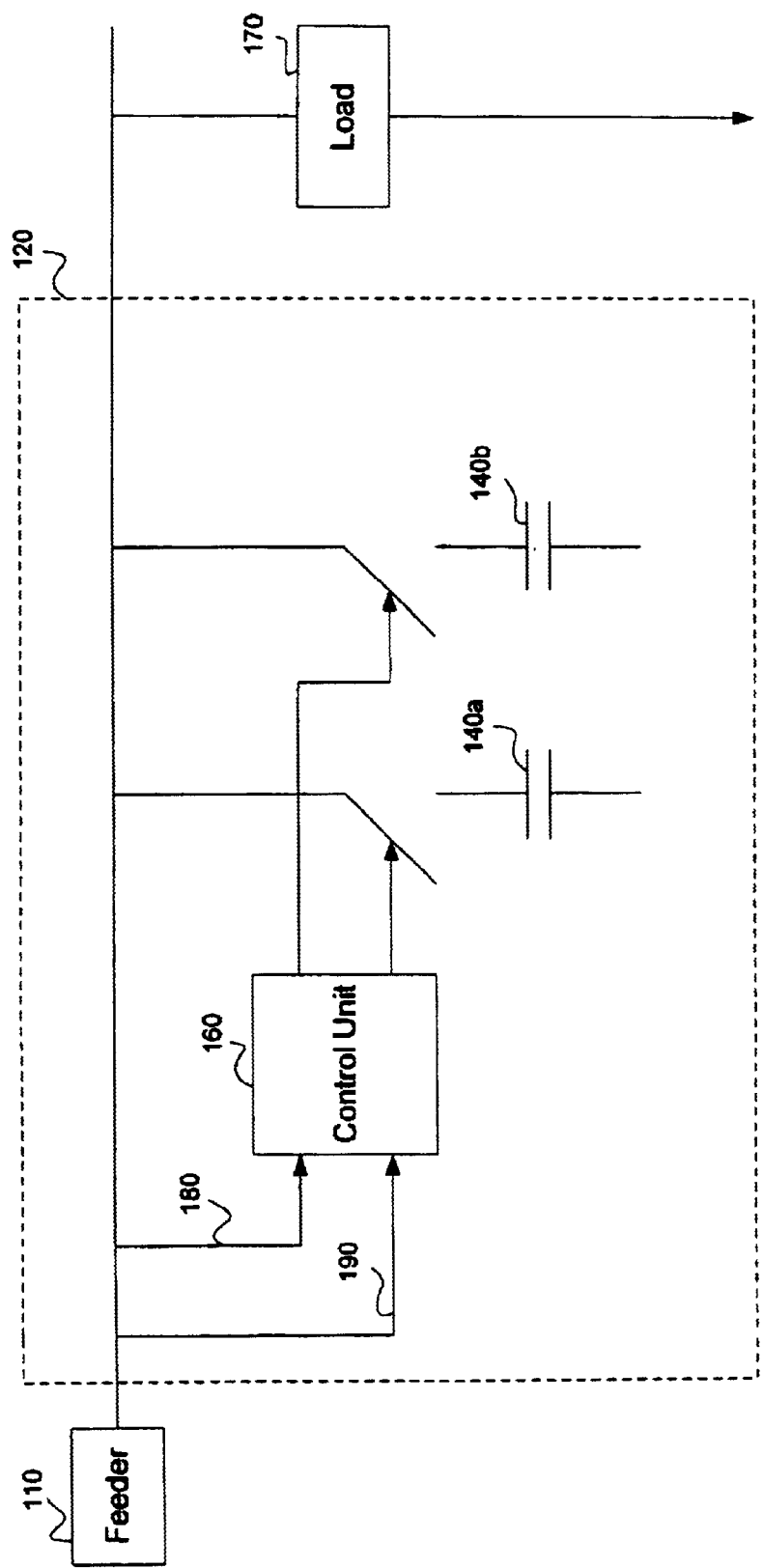
FIG. 1 illustrates a switched power capacitor device in accordance with an aspect of the present invention.

Systems and methods for coordinated control of a switched power capacitor with an integrated resonance protection function in accordance with the present invention are described below with reference to FIGS. 1–3. Those skilled in the art will readily appreciate that the description given herein with respect to those figures is for explanatory purposes only and is not intended in any way to limit the scope of the invention. Throughout the description, like reference numerals will refer to like elements in the respective figures.

FIG. 1 illustrates a switched power capacitor device 120 in accordance with an aspect of the present invention. As shown, feeder 110 feeds switched power capacitor device 120 that includes breaker switched capacitor banks 140a and 140b along with control unit 160. Control unit 160 measures voltage 180 and current 190 to determine switching operations for capacitor banks 140a and 140b that provide the desired power to load 170.

Figure 2:
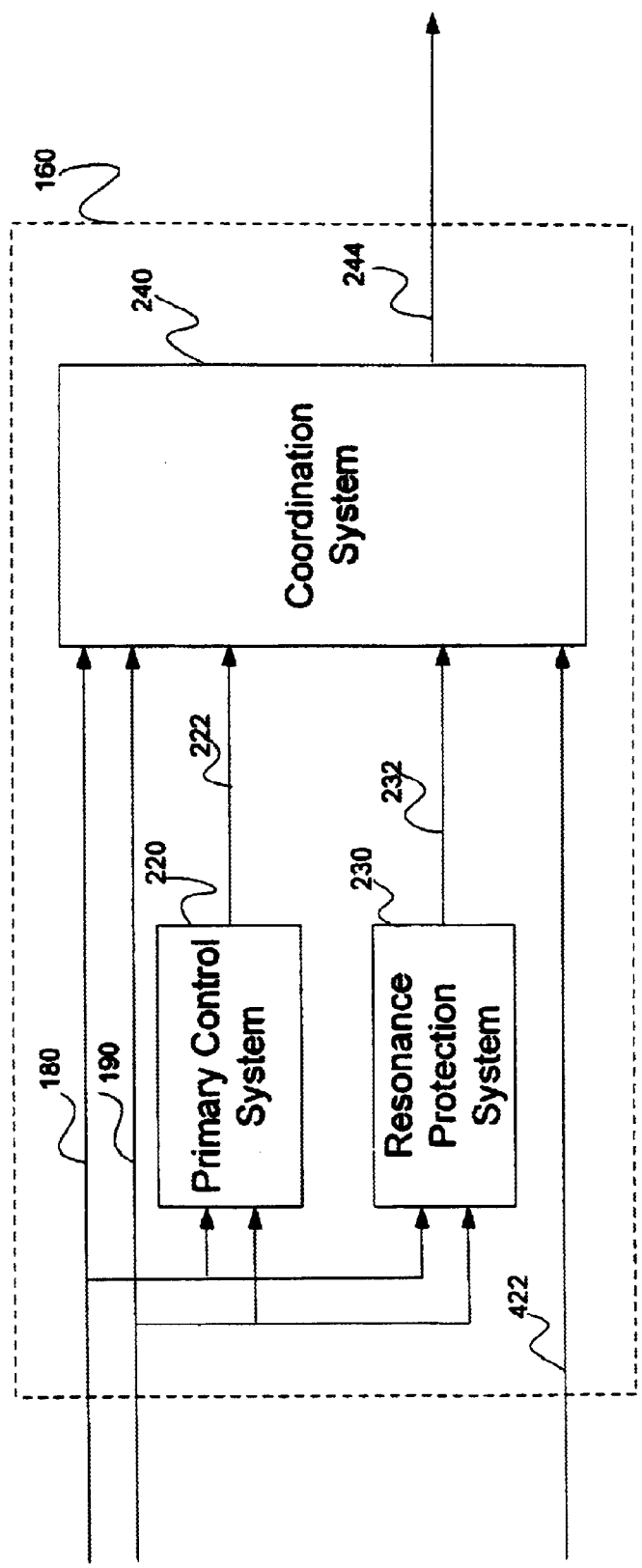
FIG. 2 illustrates a block diagram of a control unit of a switched power capacitor device in accordance with the present invention.

FIG. 2 illustrates a block diagram of the control unit 160 of the switched power capacitor device 120 in accordance with the present invention. Generally, primary control system 220 calculates control parameters. Resonance protection system 230 determines if a harmonic resonance condition is present. Coordination system 240 adjusts the control parameters if a harmonic resonance condition is present and performs capacitor switching operations based on the control parameters.

As shown in FIG. 2, primary control system 220 transmits control parameters 222 to coordination system 240. Control parameters 222 comprise any parameter relevant to the control of a switched power capacitor, such as, for example, power factor and node voltage. Control parameters 222 consist of both pre-determined target parameters and actual parameters calculated by primary control system 220. Control parameters 222 may also consist of the difference between target parameters and actual parameters. Primary control system calculates actual parameters based on measurements of voltage 180 and current 190 obtained with voltage and current transformers respectively.

Resonance protection system 230 determines if a harmonic resonance condition is present and transmits an input 232 to coordination system 240 indicating whether a harmonic resonance condition had been detected. Exemplary methods for determining if a harmonic resonance condition is present are described in detail in U.S. Pat No. 6,181,113 which is hereby incorporated by reference in its entirety. If input 232 indicates that a harmonic resonance condition is present, then coordination system 240 adjusts control parameters 222. Coordination system 240 adjusts control parameters 222 to de-tune switched power capacitor 120 from a harmonic resonance condition. Coordination system 240 may adjust control parameters 222 by any method such as, for example, reducing the target reactive power by the value of the reactive power provided by one capacitor bank.

Coordination system 240 performs capacitor bank switching operations 244 based on control parameters 222. Coordination system 240 compares actual control parameters to target control parameters, and determines if a switching operation is necessary to make the value of the actual parameters closer to the value of the target parameters. Coordination system 240 further determines whether a switching operation is needed based on other factors such as, for example, the operating status 242 of each capacitor bank and the size of each capacitor. Determining the operating status 242 of each capacitor comprises determining whether the capacitor is connected or disconnected.

Figure 3:
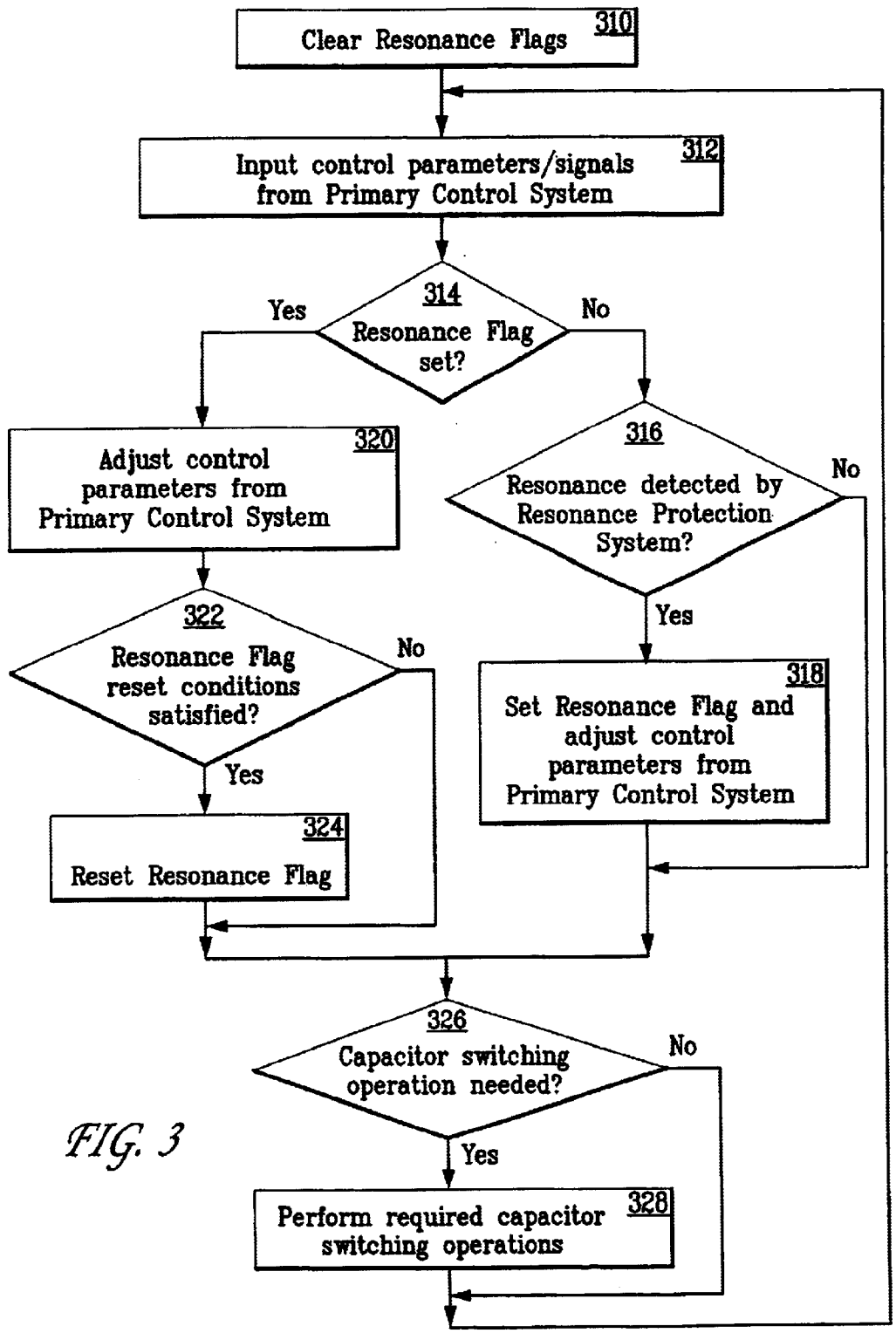
FIG. 3 illustrates a flow chart of an illustrative method for coordinating the control system of a switched power capacitor in accordance with the present invention.

FIG. 3 illustrates a flow chart of an illustrative method for controlling a switched power capacitor in accordance with the present invention. At step 310, coordination system 240 clears resonance flags. At step 312, coordination system 240 receives control parameters 222 from primary control system 220. Control parameters 222 comprise any parameter relevant to the control of a switched power capacitor, such as, for example, power factor and node voltage. At step 314, coordination system 240 determines if a resonance flag is set.

If a resonance flag is not set, then, at step 316, coordination system 240 determines whether input 232 indicates that a harmonic resonance condition is present. If a harmonic resonance condition is present, then, at step 318, coordination system 240 sets a resonance flag and adjusts control parameters 222. Coordination system 240 may adjust control parameters 222 by any method such as, for example, reducing the target reactive power by the value of the reactive power provided by one capacitor bank.

If a resonance flag is set, then, at step 320, coordination system 240 adjusts control parameters 222. The adjustment made at step 320 will be equivalent to the adjustment made at step 318 to avoid performing multiple switching operations prior to the reset of a resonance flag. At step 322, coordination system 240 determines if resonance flag reset conditions have been satisfied. A resonance flag reset condition may be triggered by the expiration of a pre-set time delay or by a system condition change that exceeds a preset threshold value. A system condition change may include events such as, for example, a load change, a system source impedance change, or a network topology change. Such events may de-tune the circuit from a resonance condition. If a resonance flag reset condition has been satisfied, then, at step 324, coordination system 240 resets the resonance flag.

At step 326, coordination system 240 determines if a capacitor bank switching operation 244 is needed. To determine if a capacitor switching operation is needed, coordination system 240 compares actual control parameters to target control parameters, and determines if a switching operation is necessary to make the value of the actual parameters closer to the value of the target parameters. Coordination system 240 further determines whether a switching operation is needed based on other factors such as, for example, the operating status 242 of each capacitor bank and the size of each capacitor. Determining the operating status 242 of each capacitor comprises determining whether the capacitor is connected or disconnected. If a capacitor bank switching operation 244 is needed, then, at step 328, coordination system 240 performs capacitor bank switching operations 244. The method then returns to step 312.

While the invention has been described and illustrated with reference to specific embodiments, those skilled in the art will recognize that modification and variations may be made without departing from the principles of the invention as described above and set forth in the following claims. For example, while the invention has been described as adjusting the control parameters by reducing the target reactive power value by the value provided by one capacitor bank, the invention may also adjust the control parameters by reducing the target reactive power value by the value provided by a plurality of capacitor banks. Furthermore, the resonance protection system may use any method to detect a harmonic resonance condition and is not limited to the method described in U.S. Pat. No. 6,181,113 which is incorporated by reference above with reference to FIG. 1. Accordingly, reference should be made to the appended claims as indicating the scope of the invention.

What is claimed:

1. A method for coordinated control of a switched power capacitor with an integrated resonance protection function, comprising the steps of:
   A. receiving control parameters and an indication of whether a harmonic resonance condition is present;
   B. if a harmonic resonance condition is present, then adjusting said control parameters; and
   C. performing capacitor switching operations based on said control parameters and returning to step A.

2. A method as in claim 1, wherein said step of receiving control parameters comprises receiving target control parameters and actual control parameters.

3. A method as in claim 1, wherein said step of receiving control parameters comprises receiving at least one of the power factor and node voltage.

4. A method as in claim 1, wherein said step of adjusting control parameters if a harmonic resonance condition is present comprises the steps of:
   determining if a resonance flag is set;
   if a resonance flag is not set, then
      a. determining if a resonance condition is present;

b. if a resonance condition is present, then adjusting control parameters and setting a resonance flag;

if a resonance flag is set, then
  a. adjusting control parameters
  b. deterrining if a resonance flag resets condition is present; and
  c. if a resonance flag reset condition is present, then resetting the resonance flag.

5. A method as in claim 4, wherein said step of determining if a resonance flag reset condition is present comprises determining if at least one of a pre-determined time delay has expired and a system condition change exceeding a pre-determined threshold value has occurred.

6. A method as in claim 5, wherein said step of determining if a system condition change exceeding a pre-determined threshold value has occurred comprises determining if at least one of a load change, a system source impedance change, and a network topology change exceeding a pre-determined threshold value has occurred.

7. A method as in claim 1, wherein said step of adjusting the control parameters comprises reducing the reactive power by the reactive power provided by one capacitor bank.

8. A method as in claim 1, wherein said step of performing capacitor switching operations comprises the steps of:

determining if capacitor switching operations are needed; and if capacitor switching operations are needed, then performing capacitor switching operations.

9. A method as in claim 8, wherein said step of determining if capacitor switching operations are needed comprises the steps of:

comparing actual control parameters with target control parameters; and determining whether a capacitor switching operation would make actual control parameters closer to target control parameters.

10. A method as in claim 9, further comprising at least one of determining whether each capacitor bank is connected or disconnected and determining the size of each capacitor.

11. A system for coordinated control of a switched power capacitor with an integrated resonance protection function, comprising a control processor programmed to perform the following process:

A. receive control parameters and an indication of whether a harmonic resonance condition is present;

B. if a harmonic resonance condition is present, then adjust said control parameters; and C. perform capacitor switching operations based on said control parameters and return to step A.

12. A system as in claim 11, wherein said control parameters comprise target control parameters and actual control parameters.

13. A system as in claim 12, wherein said control parameters comprise at least one of the power factor and node voltage.

14. A system as in claim 11, wherein adjusting control parameters if a harmonic resonance condition is present comprises:

determining if a resonance flag is set;

if a resonance flag is not set, then
    a. determining if a resonance condition is present;
    b. if a resonance condition is present, then adjusting control parameters and setting a resonance flag;

if a resonance flag is set, then
    a. adjusting control parameters
    b. determining if a resonance flag resets condition is present; and
    c. if a resonance flag reset condition is present, then resetting the resonance flag.

15. A system as in claim 14, wherein said resonance flag reset condition comprises at least one of the expiration of a pre-determined time delay and a system condition change exceeding a pre-determined threshold value.

16. A system as in claim 15, wherein said system condition change comprises at least one of a load change, a system source impedance change, and a network topology change.

17. A system as in claim 11, wherein adjusting the control parameters comprises reducing the reactive power by the reactive power provided by one capacitor bank.

18. A system as in claim 11, wherein performing capacitor switching operations comprises:

determining if capacitor switching operations are needed; and if capacitor switching operations are needed, then performing capacitor switching operations.

19. A system as in claim 18, wherein determining if capacitor switching operations are needed comprises:

comparing actual control parameters with target control parameters; and determining whether a capacitor switching operation would make actual control parameters closer to target control parameters.

20. A system as in claim 19, further comprising at least one of determining whether each capacitor bank is connected or disconnected and determining the size of each capacitor.

* * * * *